US012456567B2

(12) United States Patent
Nagai et al.

(10) Patent No.: US 12,456,567 B2
(45) Date of Patent: Oct. 28, 2025

(54) MULTILAYER COIL COMPONENT

(71) Applicant: TDK CORPORATION, Tokyo (JP)

(72) Inventors: Yusuke Nagai, Tokyo (JP); Kazuhiro Ebina, Tokyo (JP); Takahiro Sato, Tokyo (JP); Kunihiko Kawasaki, Tokyo (JP); Shinichi Sato, Tokyo (JP); Shinichi Kondo, Tokyo (JP); Kouichi Kakuda, Tokyo (JP); Yuya Ishima, Tokyo (JP); Kosuke Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 662 days.

(21) Appl. No.: 17/939,027

(22) Filed: Sep. 7, 2022

(65) Prior Publication Data

US 2023/0072794 A1 Mar. 9, 2023

(30) Foreign Application Priority Data

Sep. 9, 2021 (JP) ................................ 2021-146983

(51) Int. Cl.

*H01F 17/00* (2006.01)
*H01F 3/08* (2006.01)
*H01F 27/29* (2006.01)

(52) U.S. Cl.

CPC ........... *H01F 17/0013* (2013.01); *H01F 3/08* (2013.01); *H01F 27/292* (2013.01)

(58) Field of Classification Search

CPC ....... H01F 17/0013; H01F 3/08; H01F 27/292
See application file for complete search history.

(56) References Cited

U.S. PATENT DOCUMENTS

| | | | | |
|---|---|---|---|---|
| 2009/0261935 | A1* | 10/2009 | Hisamitsu ........... | H01F 17/0006 336/200 |
| 2013/0038416 | A1 | 2/2013 | Arai et al. | |
| 2020/0043644 | A1* | 2/2020 | Sato ........................ | H01F 5/003 |
| 2023/0395303 | A1 | 12/2023 | Sato et al. | |

FOREIGN PATENT DOCUMENTS

| | | | | |
|---|---|---|---|---|
| JP | H06112047 | A | * | 4/1994 |
| JP | H06196334 | A | * | 7/1994 |
| JP | 2000058324 | A | * | 2/2000 |
| JP | 2001-110638 | A | | 4/2001 |
| JP | 2010147416 | A | * | 7/2010 |
| JP | 2013-38263 | A | | 2/2013 |
| JP | 2013045809 | A | * | 3/2013 |
| JP | 2020-021807 | A | | 2/2020 |

* cited by examiner

*Primary Examiner* — Malcolm Barnes
(74) *Attorney, Agent, or Firm* — Oliff PLC

(57) ABSTRACT

A multilayer coil component includes: an element body formed by stacking a magnetic body layer containing a plurality of metal magnetic particles of a soft magnetic material; a first coil disposed in the element body and configured to include a plurality of first coil conductors; a second coil disposed in the element body and configured to include a plurality of second coil conductors; a first external electrode to which one end portion of each of the first coil and the second coil is connected; and a second external electrode to which the other end portion of each of the first coil and the second coil is connected.

8 Claims, 9 Drawing Sheets

MULTILAYER COIL COMPONENT

TECHNICAL FIELD

The present invention relates to a multilayer coil component.

BACKGROUND

Patent Literature 1 (Japanese Unexamined Patent Publication No. 2013-38263) discloses a multilayer coil component including a component main body (element body) and one coil disposed in the component main body and configured by a plurality of conductor portions.

SUMMARY

An object of one aspect of the present invention is to provide a multilayer coil component capable of reducing electrical resistivity.

A multilayer coil component according to one aspect of the present invention includes: an element body formed by stacking a magnetic body layer containing a plurality of metal magnetic particles of a soft magnetic material; a first coil disposed in the element body and configured to include a plurality of first coil conductors; a second coil disposed in the element body and configured to include a plurality of second coil conductors; a first external electrode to which one end portion of each of the first coil and the second coil is connected; and a second external electrode to which the other end portion of each of the first coil and the second coil is connected.

In the multilayer coil component according to one aspect of the present invention, the first coil and the second coil are disposed in the element body. One end portion of each of the first coil and the second coil is connected to the first external electrode, and the other end portion of each of the first coil and the second coil is connected to the second external electrode. As a result, the multilayer coil component has a configuration in which the first coil and the second coil are connected in parallel. Accordingly, in the multilayer coil component, at least two current flow paths can be ensured as compared with a configuration in which one coil is disposed in the element body, and thus the electrical resistivity of direct current resistance can be reduced. As a result, in the multilayer coil component, the quality factor (Q) value can be increased, and thus characteristics can be improved. In addition, in the multilayer coil component, loss attributable to heat generation can be reduced, and thus quality can be improved.

In the multilayer coil component, the element body is formed by stacking the magnetic body layer containing a plurality of metal magnetic particles of a soft magnetic alloy. As a result, in the multilayer coil component, direct current superimposition characteristics can be improved as compared with an element body formed of a ferrite material.

In one embodiment, the first coil and the second coil may be separated from each other in a stacking direction of the magnetic body layer in the element body and, between the first coil and the second coil of the element body, at least a region where the first coil and the second coil overlap when viewed from the stacking direction may be higher in electrical resistivity than the magnetic body layer. In this configuration, the electrical resistivity between the layers of the first coil and the second coil can be made higher than that of the element body material. As a result, the withstand voltage of the multilayer coil component can be improved.

In one embodiment, a high-resistance portion having a width dimension equal to or greater than width dimensions of the first coil conductor and the second coil conductor and higher in electrical resistivity than the magnetic body layer may be disposed in the region where the first coil and the second coil overlap when viewed from the stacking direction. In this configuration, the electrical resistivity between the layers of the first coil and the second coil can be made higher than that of the element body material by the high-resistance portion. As a result, the withstand voltage of the multilayer coil component can be improved.

In one embodiment, a high-resistance layer higher in electrical resistivity than the magnetic body layer may be provided between the first coil and the second coil in the element body. In this configuration, the electrical resistivity between the layers of the first coil and the second coil can be made higher than that of the element body material by the high-resistance layer. As a result, the withstand voltage of the multilayer coil component can be improved.

In one embodiment, a conductor closest to the second coil in the first coil and a conductor closest to the first coil in the second coil may not overlap when viewed from a stacking direction of the magnetic body layer. With this configuration, the withstand voltage of the multilayer coil component can be improved.

In one embodiment, the first coil may have a first connecting conductor connected to the first external electrode and a second connecting conductor connected to the second external electrode, the second coil may have a third connecting conductor connected to the first external electrode and a fourth connecting conductor connected to the second external electrode, a distance between the second connecting conductor and the fourth connecting conductor may be shorter than a distance between the first connecting conductor and the third connecting conductor in a stacking direction of the magnetic body layer, and a winding direction of the first coil and a winding direction of the second coil may be the same when viewed from the stacking direction. In this configuration, by the distance between the second connecting conductor and the fourth connecting conductor being shorter than the distance between the first connecting conductor and the third connecting conductor in the stacking direction of the magnetic body layer, it is possible to reduce the potential difference between the first coil and the second coil when a current flows through the first coil and the second coil. Accordingly, the withstand voltage of the multilayer coil component can be improved. In addition, the winding direction of the first coil and the winding direction of the second coil are the same when viewed from the stacking direction, and thus the orientations of the magnetic fluxes of the first coil and the second coil are the same. As a result, the inductance values of the first coil and the second coil can be made equal.

In one embodiment, the first coil may have a first connecting conductor connected to the first external electrode and a second connecting conductor connected to the second external electrode, the second coil may have a third connecting conductor connected to the first external electrode and a fourth connecting conductor connected to the second external electrode, a distance between the second connecting conductor and the fourth connecting conductor may be shorter than a distance between the first connecting conductor and the third connecting conductor in a stacking direction of the magnetic body layer, and a winding direction of the first coil may be opposite to a winding direction of the second coil when viewed from the stacking direction. In this configuration, the potential difference can be reduced by the distance between the second connecting conductor and the fourth connecting conductor being shorter than the distance between the first connecting conductor and the third connecting conductor in the stacking direction of the magnetic body layer. Accordingly, the withstand voltage of the multilayer coil component can be improved. In addition, the winding direction of the first coil is opposite to the winding direction of the second coil when viewed from the stacking direction, and thus the magnetic flux generated by the first coil and the magnetic flux generated by the second coil cancel each other out. Accordingly, magnetic saturation can be suppressed, and thus direct current superimposition characteristics can be improved.

In one embodiment, the number of the first coil conductors of the first coil may be the same as the number of the second coil conductors of the second coil. In this configuration, the magnetic flux generated by the first coil and the magnetic flux generated by the second coil can be effectively offset. Accordingly, magnetic saturation can be suppressed more effectively, and thus direct current superimposition characteristics can be improved.

In one embodiment, the two or more metal magnetic particles may be disposed along a stacking direction of the magnetic body layer between the first coil and the second coil. With this configuration, the withstand voltage between the layers of the first coil and the second coil can be improved.

According to one aspect of the present invention, electrical resistivity can be reduced.

DETAILED DESCRIPTION

Figure 1:
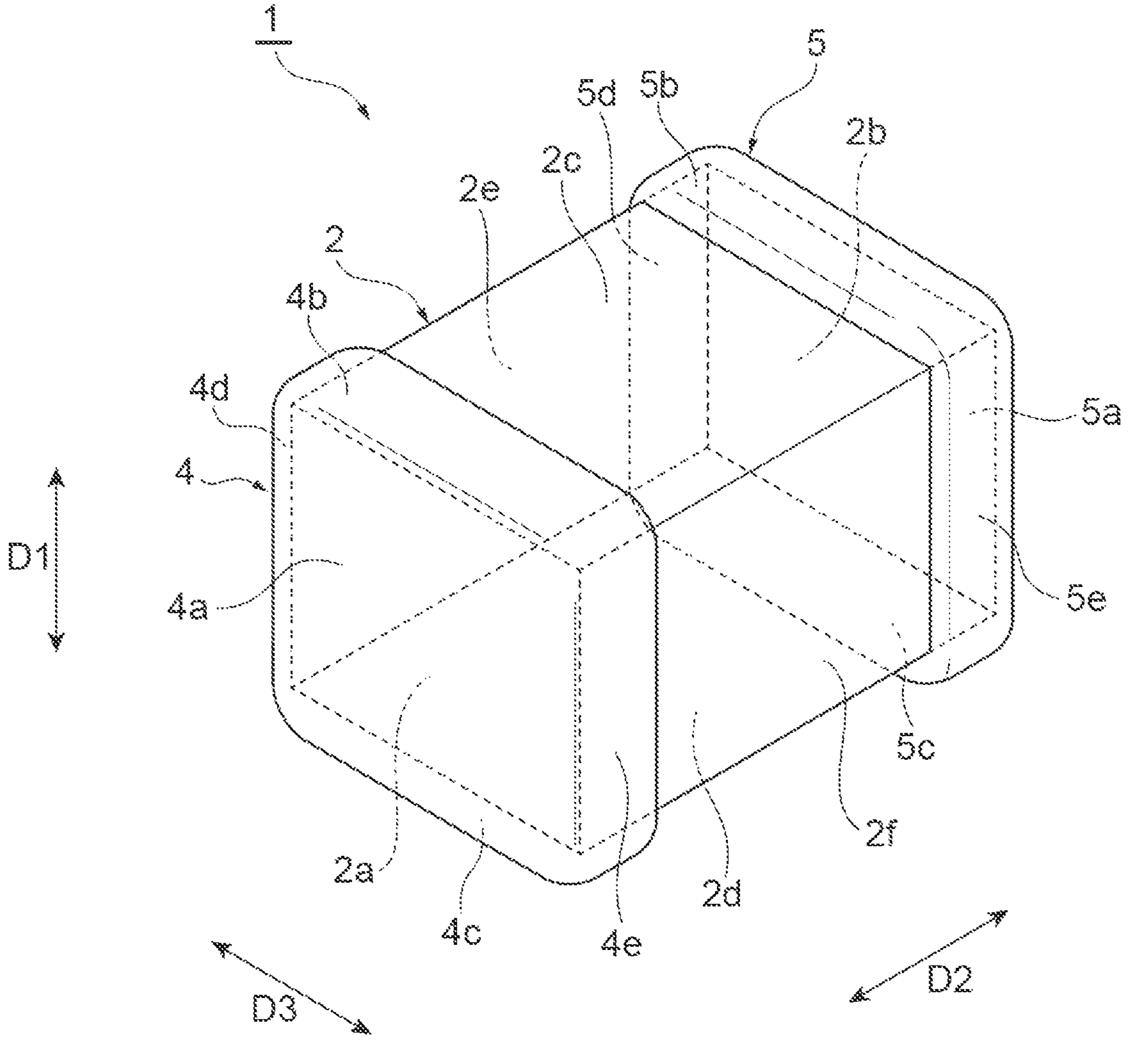
FIG. 1 is a perspective view illustrating a multilayer coil component according to a first embodiment.

Hereinafter, preferred embodiments of the present invention will be described in detail with reference to the accompanying drawings. It should be noted that in the description of the drawings, the same or equivalent elements are denoted by the same reference numerals with redundant description omitted.

First Embodiment

As illustrated in FIG. 1, a multilayer coil component 1 according to a first embodiment includes an element body 2 and a first external electrode 4 and a second external electrode 5 respectively disposed on both end portions of the element body 2.

The element body 2 has a rectangular parallelepiped shape. The rectangular parallelepiped shape includes the shape of a rectangular parallelepiped with chamfered corner and ridge portions and the shape of a rectangular parallelepiped with rounded corner and ridge portions. The element body 2 has, as the outer surfaces thereof, a pair of end surfaces 2*a* and 2*b* facing each other, a pair of main surfaces 2*c* and 2*d* facing each other, and a pair of side surfaces 2*e* and 2*f* facing each other. The facing direction in which the pair of main surfaces 2*c* and 2*d* face each other is a first direction D1. The facing direction in which the pair of end surfaces 2*a* and 2*b* face each other is a second direction D2. The facing direction in which the pair of side surfaces 2*e* and 2*f* face each other is a third direction D3. In the present embodiment, the first direction D1 is the height direction of the element body 2. The second direction D2 is the longitudinal direction of the element body 2 and is orthogonal to the first direction D1. The third direction D3 is the width direction of the element body 2 and is orthogonal to the first direction D1 and the second direction D2.

The pair of end surfaces 2*a* and 2*b* extend in the first direction D1 so as to interconnect the pair of main surfaces 2*c* and 2*d*. The pair of end surfaces 2*a* and 2*b* also extend in the third direction D3 (short side direction of the pair of main surfaces 2*c* and 2*d*). The pair of side surfaces 2*e* and 2*f* extend in the first direction D1 so as to interconnect the pair of main surfaces 2*c* and 2*d*. The pair of side surfaces 2*e* and 2*f* also extend in the second direction D2 (long side direction of the pair of end surfaces 2*a* and 2*b*). The main surface 2*d* can be defined as a mounting surface facing another electronic device when the multilayer coil component 1 is mounted on the electronic device (for example, a circuit board or an electronic component).

Figure 3:
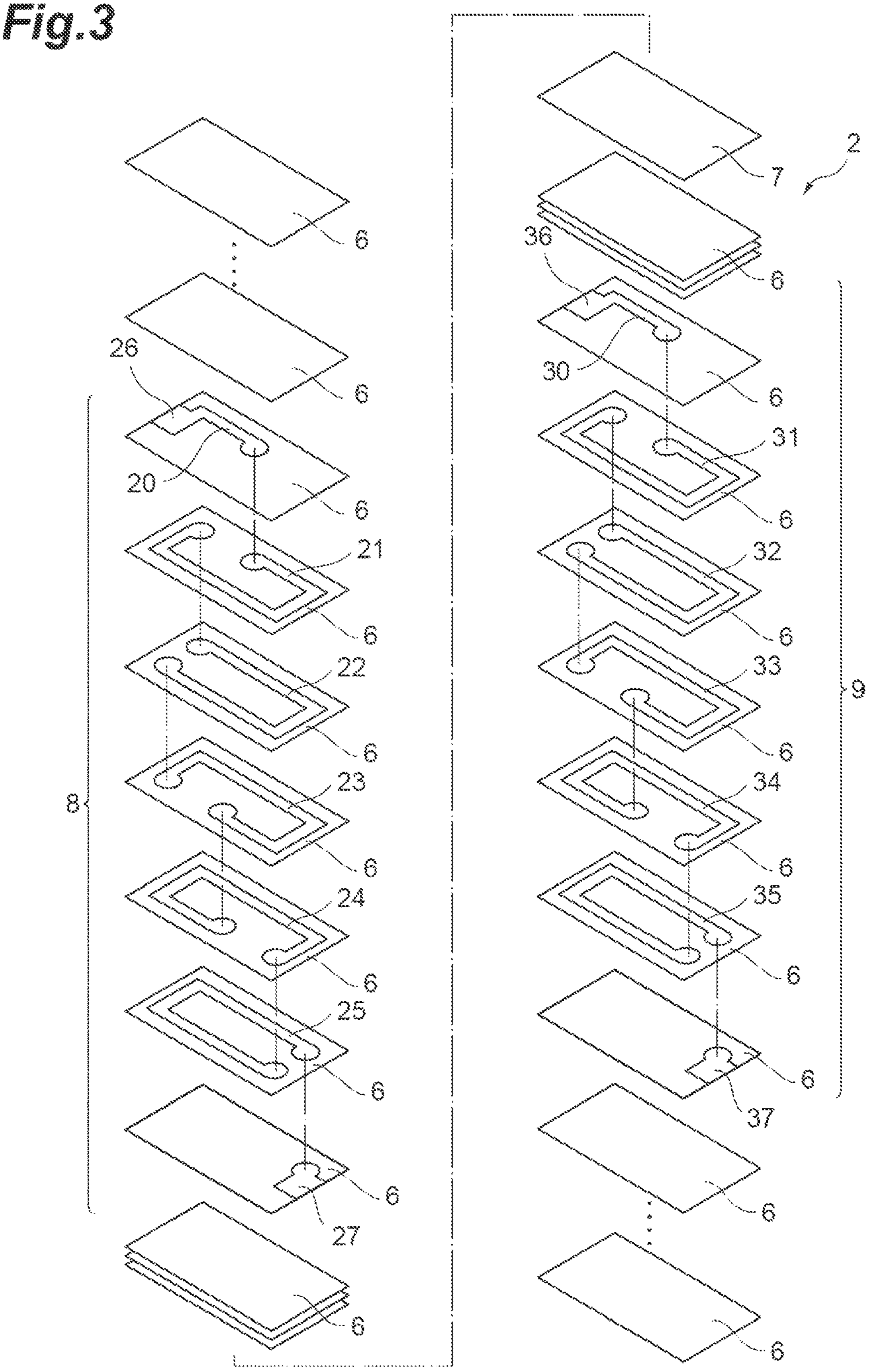
FIG. 3 is an exploded perspective view of the multilayer coil component illustrated in FIG. 1.

As illustrated in FIG. 3, the element body 2 is configured by stacking a plurality of magnetic body layers 6 and a magnetic body layer 7. Each magnetic body layer 6 and the magnetic body layer 7 are stacked in the first direction D1. In other words, the first direction D1 is the stacking direction. The element body 2 has the plurality of magnetic body layers 6 and the magnetic body layer 7 that are stacked. In the actual element body 2, the plurality of magnetic body layers 6 and the magnetic body layer 7 are integrated to the extent that the boundary between the layers cannot be visually recognized.

Each magnetic body layer 6 and the magnetic body layer 7 contain a plurality of metal magnetic particles. The metal magnetic particles are configured from a soft magnetic alloy (soft magnetic material). The soft magnetic alloy is, for example, a Fe—Si-based alloy. In a case where the soft magnetic alloy is a Fe—Si-based alloy, the soft magnetic alloy may contain P. The soft magnetic alloy may be, for example, a Fe—Ni—Si—M-based alloy. "M" contains one or more elements selected from Co, Cr, Mn, P, Ti, Zr, Hf, Nb, Ta, Mo, Mg, Ca, Sr, Ba, Zn, B, Al, and rare-earth elements.

The metal magnetic particles are bonded to each other in the magnetic body layer 6 and the magnetic body layer 7. The bond between the metal magnetic particles is realized by, for example, the bond between the oxide films formed on the surfaces of the metal magnetic particles. In the magnetic body layer 6 and the magnetic body layer 7, the metal magnetic particles are electrically insulated from each other by the bond between the oxide films. The thickness of the oxide film is, for example, 5 to 60 nm or less. The oxide film may be configured by one or more layers.

The magnetic body layer 7 contains a material higher in electrical resistivity than each magnetic body layer 6. In the present embodiment, the magnetic body layer 7 contains, for example, $ZrO_2$. The magnetic body layer 7 is disposed between the magnetic body layer 6 and the magnetic body layer 6 in the first direction D1. The magnetic body layer 7 is disposed between a first coil 8 and a second coil 9. The magnetic body layer 7 configures a high-resistance layer in the element body 2. It should be noted that a plurality of the magnetic body layers 7 may be included.

The element body 2 contains a resin. The resin is present between the plurality of metal magnetic particles. The resin is an electrically insulating resin (insulating resin). The insulating resin includes, for example, a silicone resin, a phenol resin, an acrylic resin, or an epoxy resin.

The average particle size of the metal magnetic particles is 0.5 to 15 μm. In the present embodiment, the average particle size of the metal magnetic particles is 5 μm. In the present embodiment, the "average particle size" means the particle size at an integrated value of 50% in a particle size distribution obtained by the laser diffraction-scattering method.

As illustrated in FIG. 1, the first external electrode 4 is disposed on the end surface 2*a* side of the element body 2, and the second external electrode 5 is disposed on the end surface 2*b* side of the element body 2. In other words, the first external electrode 4 and the second external electrode 5 are positioned apart from each other in the facing direction of the pair of end surfaces 2*a* and 2*b*. The first external electrode 4 and the second external electrode 5 contain a conductive material (for example, Ag or Pd). The first external electrode 4 and the second external electrode 5 are configured as sintered bodies of a conductive paste containing a conductive metal powder (for example, Ag powder or Pd powder) and glass frit. By electroplating, plating layers are formed on the surfaces of the first external electrode 4 and the second external electrode 5. Ni, Sn, or the like is used for the electroplating.

The first external electrode 4 is disposed on one end surface 2*a* side. The first external electrode 4 includes the five electrode parts of a first electrode part 4*a* positioned on the end surface 2*a*, a second electrode part 4*b* positioned on the main surface 2*c*, a third electrode part 4*c* positioned on the main surface 2*d*, a fourth electrode part 4*d* positioned on the side surface 2*e*, and a fifth electrode part 4*e* positioned on the side surface 2*f*. The first electrode part 4*a* and the second electrode part 4*b*, the third electrode part 4*c*, the fourth electrode part 4*d*, and the fifth electrode part 4*e* are connected in the ridge portion of the element body 2 and are electrically interconnected. The first external electrode 4 is formed on the five surfaces of one end surface 2*a*, the pair of main surfaces 2*c* and 2*d*, and the pair of side surfaces 2*e* and 2*f*. The first electrode part 4*a*, the second electrode part 4*b*, the third electrode part 4*c*, the fourth electrode part 4*d*, and the fifth electrode part 4*e* are integrally formed.

In the present embodiment, the edges (end surfaces) of the second electrode part 4*b* and the third electrode part 4*c* of the first external electrode 4 are along, for example, the third direction D3. The edge of the second electrode part 4*b* is linearly formed on the main surface 2*c*. The edge of the third electrode part 4*c* is linearly formed on the main surface 2*d*. The edges of the fourth electrode part 4*d* and the fifth electrode part 4*e* of the first external electrode 4 are along the first direction D1. The edge of the fourth electrode part 4*d* is linearly formed on the side surface 2*e*. The edge of the fifth electrode part 4*e* is linearly formed on the side surface 2*f*. It should be noted that the shape of the edge of each of the second electrode part 4*b*, the third electrode part 4*c*, the fourth electrode part 4*d*, and the fifth electrode part 4*e* may be curved or may be uneven.

The second external electrode 5 is disposed on the other end surface 2*b* side. The second external electrode 5 includes the five electrode parts of a first electrode part 5*a* positioned on the end surface 2*b*, a second electrode part 5*b* positioned on the main surface 2*c*, a third electrode part 5*c* positioned on the main surface 2*d*, a fourth electrode part 5*d* positioned on the side surface 2*e*, and a fifth electrode part 5*e* positioned on the side surface 2*f*. The first electrode part 5*a* and the second electrode part 5*b*, the third electrode part 5*c*, the fourth electrode part 5*d*, and the fifth electrode part 5*e* are connected in the ridge portion of the element body 2 and are electrically interconnected. The second external electrode 5 is formed on the five surfaces of one end surface 2*b*, the pair of main surfaces 2*c* and 2*d*, and the pair of side surfaces 2*e* and 2*f*. The first electrode part 5*a*, the second electrode part 5*b*, the third electrode part 5*c*, the fourth electrode part 5*d*, and the fifth electrode part 5*e* are integrally formed.

In the present embodiment, the edges of the second electrode part 5*b* and the third electrode part 5*c* of the second external electrode 5 are along, for example, the third direction D3. The edge of the second electrode part 5*b* is linearly formed on the main surface 2*c*. The edge of the third electrode part 5*c* is linearly formed on the main surface 2*d*. The edges of the fourth electrode part 5*d* and the fifth electrode part 5*e* of the second external electrode 5 are along the first direction D1. The edge of the fourth electrode part 5*d* is linearly formed on the side surface 2*e*. The edge of the fifth electrode part 5*e* is linearly formed on the side surface 2*f*. It should be noted that the shape of the edge of each of the second electrode part 5*b*, the third electrode part 5*c*, the fourth electrode part 5*d*, and the fifth electrode part 5*e* may be curved or may be uneven.

Figure 2:
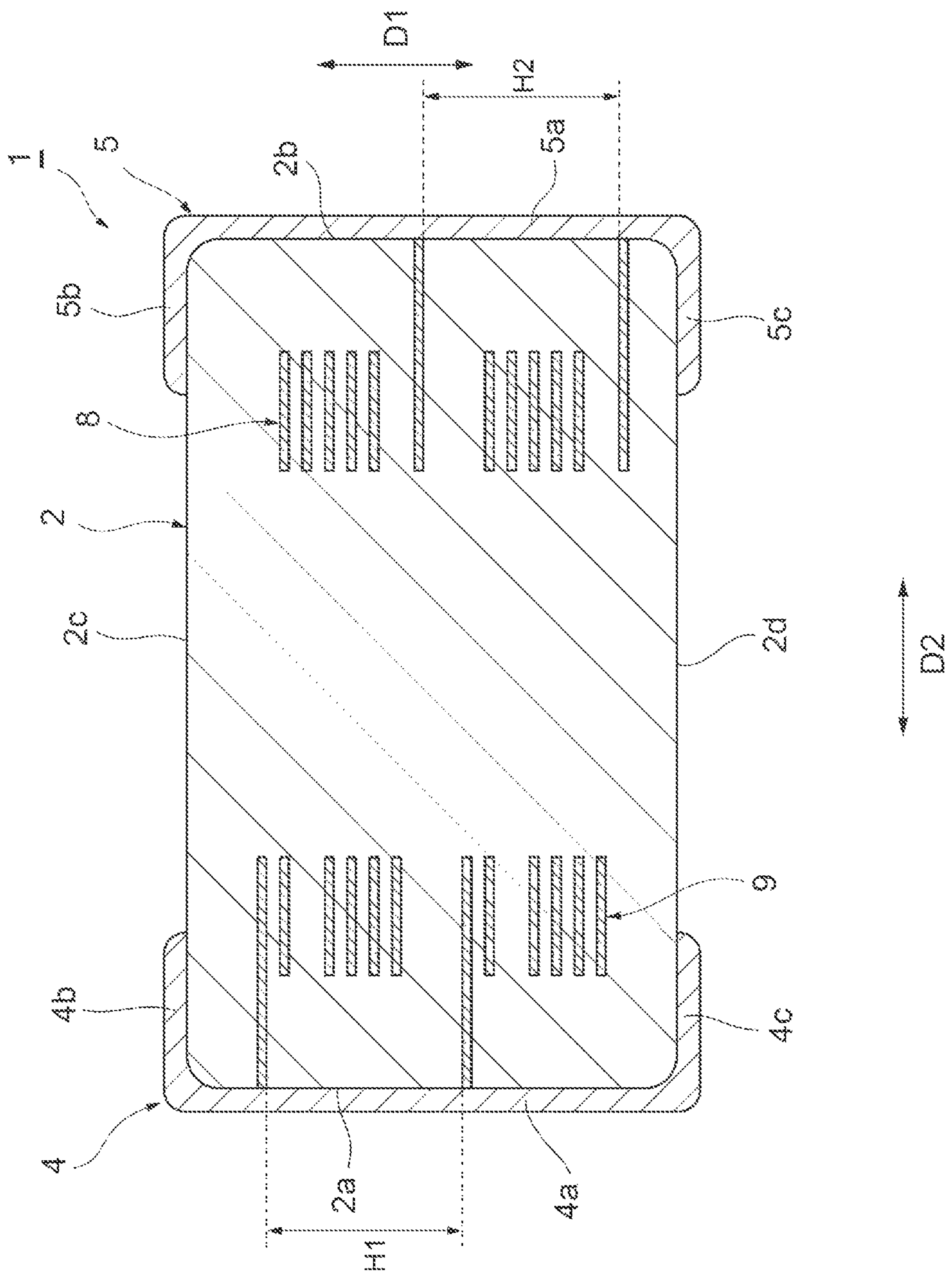
FIG. 2 is a diagram illustrating a cross-sectional configuration of the multilayer coil component illustrated in FIG. 1.

As for the multilayer coil component 1, the first coil 8 and the second coil 9 are disposed in the element body 2 as illustrated in FIG. 2. The first coil 8 and the second coil 9 are separated in the first direction D1 in the element body 2. In the present embodiment, the first coil 8 is disposed on the main surface 2*c* side of the element body 2. Specifically, the first coil 8 is disposed in the region that is closer to the main surface 2*c* side than the middle of the element body 2 in the first direction D1. The second coil 9 is disposed on the main surface 2*d* side of the element body 2. Specifically, the second coil 9 is disposed in the region that is closer to the main surface 2*d* side than the middle of the element body 2 in the first direction D1. In the multilayer coil component 1, the first coil 8 and the second coil 9 are electrically connected in parallel.

As illustrated in FIG. 3, the first coil 8 is configured in a spiral shape with a plurality of first coil conductors 20, 21, 22, 23, 24, and 25 and a first connecting conductor 26 and a second connecting conductor 27 electrically connected. The first coil conductor 20 and the first connecting conductor 26 are integrally formed. The adjacent first coil conductors 20, 21, 22, 23, 24, and 25 are electrically connected by a through hole conductor (not illustrated). The first coil conductor 25 and the second connecting conductor 27 are electrically connected by a through hole conductor (not illustrated). The first connecting conductor 26 configures one end portion of the first coil 8. The first connecting conductor 26 is exposed on the end surface 2*a* of the element body 2 and is connected to the first external electrode 4 (first electrode part 4*a*). The second connecting conductor 27 configures the other end portion of the first coil 8. The second connecting conductor 27 is exposed on the end surface 2_b_ of the element body 2 and is connected to the second external electrode 5 (first electrode part 5_a_).

The second coil 9 is configured in a spiral shape with a plurality of second coil conductors 30, 31, 32, 33, 34, and 35 and a third connecting conductor 36 and a fourth connecting conductor 37 electrically connected. The second coil conductor 30 and the third connecting conductor 36 are integrally formed. The adjacent second coil conductors 30, 31, 32, 33, 34, and 35 are electrically connected by a through hole conductor (not illustrated). The second coil conductor 35 and the fourth connecting conductor 37 are electrically connected by a through hole conductor (not illustrated). The third connecting conductor 36 configures one end portion of the second coil 9. The third connecting conductor 36 is exposed on the end surface 2_a_ of the element body 2 and is connected to the first external electrode 4 (first electrode part 4_a_). The fourth connecting conductor 37 configures the other end portion of the second coil 9. The fourth connecting conductor 37 is exposed on the end surface 2_b_ of the element body 2 and is connected to the second external electrode 5 (first electrode part 5_a_).

The first coil conductors 20, 21, 22, 23, 24, and 25, the first connecting conductor 26, the second connecting conductor 27, the second coil conductors 30, 31, 32, 33, 34, and 35, the third connecting conductor 36, and the fourth connecting conductor 37 are made of a conductive material usually used as a conductor of a coil (for example, Ni or Cu). The first coil conductors 20, 21, 22, 23, 24, and 25, the first connecting conductor 26, the second connecting conductor 27, the second coil conductors 30, 31, 32, 33, 34, and 35, the third connecting conductor 36, and the fourth connecting conductor 37 are configured as a sintered body of a conductive paste containing the above conductive material.

As illustrated in FIG. 2, between the first coil 8 and the second coil 9 of the element body 2 in the multilayer coil component 1, at least the region where the first coil 8 and the second coil 9 overlap when viewed from the first direction D1 is higher in electrical resistivity than the magnetic body layer 6. In the present embodiment, the magnetic body layer 7 (high-resistance layer) higher in electrical resistivity than the magnetic body layer 6 configuring most of the element body 2 is provided between the first coil 8 and the second coil 9 in the element body 2.

Between the first coil 8 and the second coil 9, two or more metal magnetic particles are disposed along the first direction D1. The metal magnetic particles are lined up along the first direction D1. The metal magnetic particles being lined up along the first direction D1 includes not only a state where the entire metal magnetic particles overlap when viewed from the first direction D1 but also a state where the metal magnetic particles overlap at least in part when viewed from the first direction D1.

In the multilayer coil component 1, a distance H1 between the first connecting conductor 26 of the first coil 8 and the third connecting conductor 36 of the second coil 9 is the same as a distance H2 between the second connecting conductor 27 of the first coil 8 and the fourth connecting conductor 37 of the second coil 9. The winding direction of the first coil 8 and the winding direction of the second coil 9 are the same. As a result, when a current flows through the multilayer coil component 1, the orientation of the magnetic flux generated in the first coil 8 and the orientation of the magnetic flux generated in the second coil 9 become the same.

In the multilayer coil component 1, the conductor that is closest to the second coil 9 in the first coil 8 and the conductor that is closest to the first coil 8 in the second coil 9 do not overlap when viewed from the first direction D1. Specifically, the second connecting conductor 27 of the first coil 8 and the second coil conductor 30 and the third connecting conductor 36 of the second coil 9 do not overlap when viewed from the first direction D1.

As described above, in the multilayer coil component 1 according to the present embodiment, the first coil 8 and the second coil 9 are disposed in the element body 2. One end portion of each of the first coil 8 and the second coil 9 is connected to the first external electrode 4, and the other end portion of each of the first coil 8 and the second coil 9 is connected to the second external electrode 5. As a result, the multilayer coil component 1 has a configuration in which the first coil 8 and the second coil 9 are connected in parallel. Accordingly, in the multilayer coil component 1, at least two current flow paths can be ensured as compared with a configuration in which one coil is disposed in the element body 2, and thus the electrical resistivity of direct current resistance can be reduced. As a result, in the multilayer coil component 1, the quality factor (Q) value can be increased, and thus characteristics can be improved. In addition, in the multilayer coil component 1, loss attributable to heat generation can be reduced, and thus quality can be improved.

In the multilayer coil component 1, the element body 2 is formed by stacking the magnetic body layer 6 containing a plurality of metal magnetic particles of a soft magnetic alloy. As a result, in the multilayer coil component 1, direct current superimposition characteristics can be improved as compared with an element body formed of a ferrite material.

In the multilayer coil component 1 according to the present embodiment, the first coil 8 and the second coil 9 are separated from each other in the stacking direction of the magnetic body layer 6 in the element body 2. Between the first coil 8 and the second coil 9 of the element body 2, at least the region where the first coil 8 and the second coil 9 overlap when viewed from the first direction D1 is higher in electrical resistivity than the magnetic body layer 6. Specifically, in the element body 2, the magnetic body layer 7 (high-resistance layer) higher in electrical resistivity than the magnetic body layer 6 is provided between the first coil 8 and the second coil 9. In this configuration, the electrical resistivity between the layers of the first coil 8 and the second coil 9 can be made higher than that of the element body material by the magnetic body layer 7. As a result, the withstand voltage of the multilayer coil component 1 can be improved.

In the multilayer coil component 1 according to the present embodiment, the winding direction of the first coil 8 and the winding direction of the second coil 9 are the same. As a result, when a current flows through the multilayer coil component 1, the orientation of the magnetic flux generated in the first coil 8 and the orientation of the magnetic flux generated in the second coil 9 become the same. Accordingly, in the multilayer coil component 1, the inductance values of the first coil 8 and the second coil 9 can be made the same.

In the multilayer coil component 1 according to the present embodiment, the conductor that is closest to the second coil 9 in the first coil 8 and the conductor that is closest to the first coil 8 in the second coil 9 do not overlap when viewed from the first direction D1. Specifically, the second connecting conductor 27 of the first coil 8 and the second coil conductor 30 and the third connecting conductor 36 of the second coil 9 do not overlap when viewed from the first direction D1. With this configuration, the withstand voltage of the multilayer coil component 1 can be improved.

In the multilayer coil component 1 according to the present embodiment, two or more metal magnetic particles are disposed along the first direction D1 between the first coil 8 and the second coil 9. With this configuration, the withstand voltage of the multilayer coil component 1 can be improved.

Second Embodiment

Figure 4:
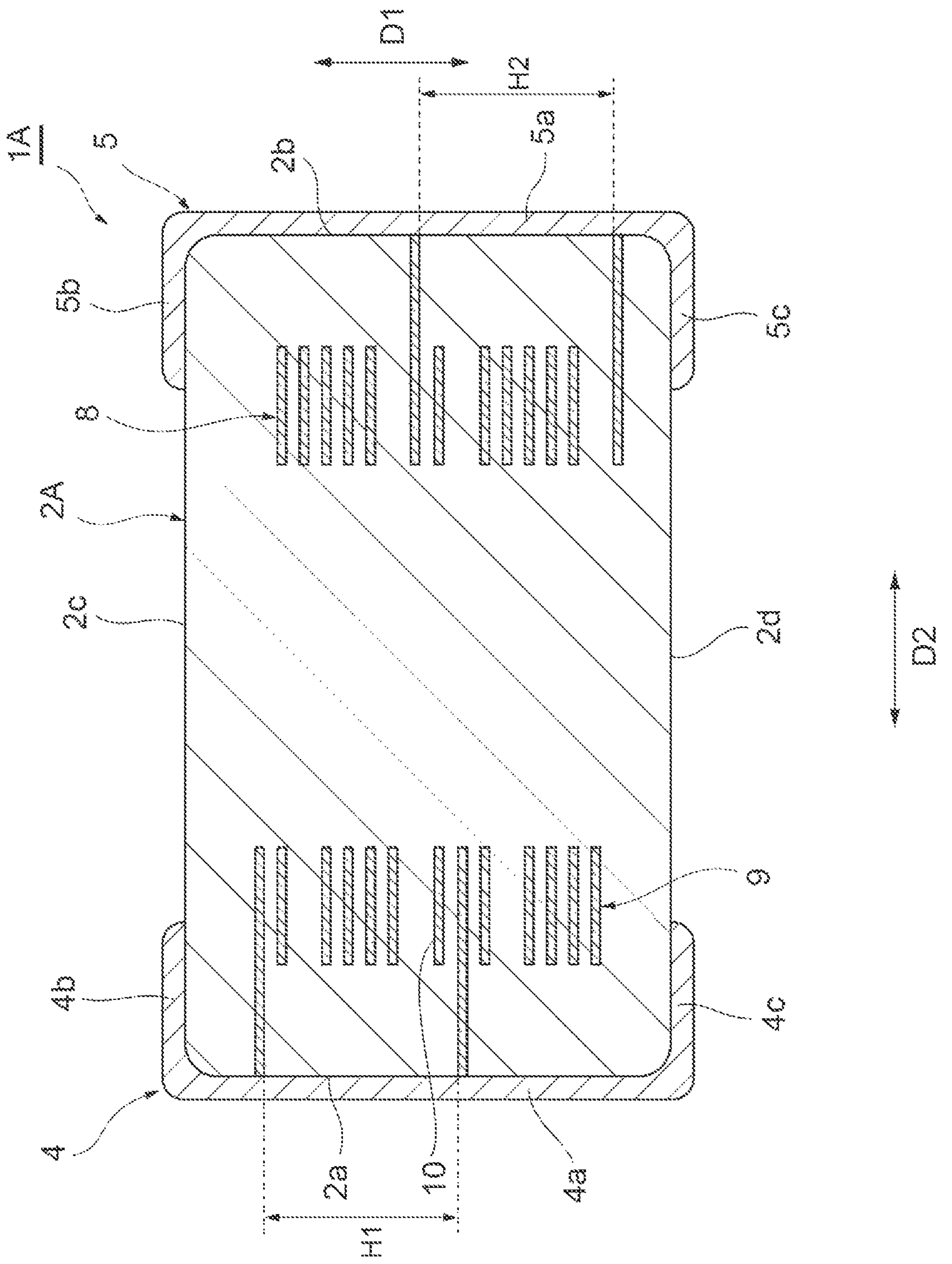
FIG. 4 is a diagram illustrating a cross-sectional configuration of a multilayer coil component according to a second embodiment.

Next, a second embodiment will be described. As illustrated in FIG. 4, a multilayer coil component 1A according to the second embodiment includes an element body 2A and the first external electrode 4 and the second external electrode 5 respectively disposed on both end portions of the element body 2A.

Figure 5:
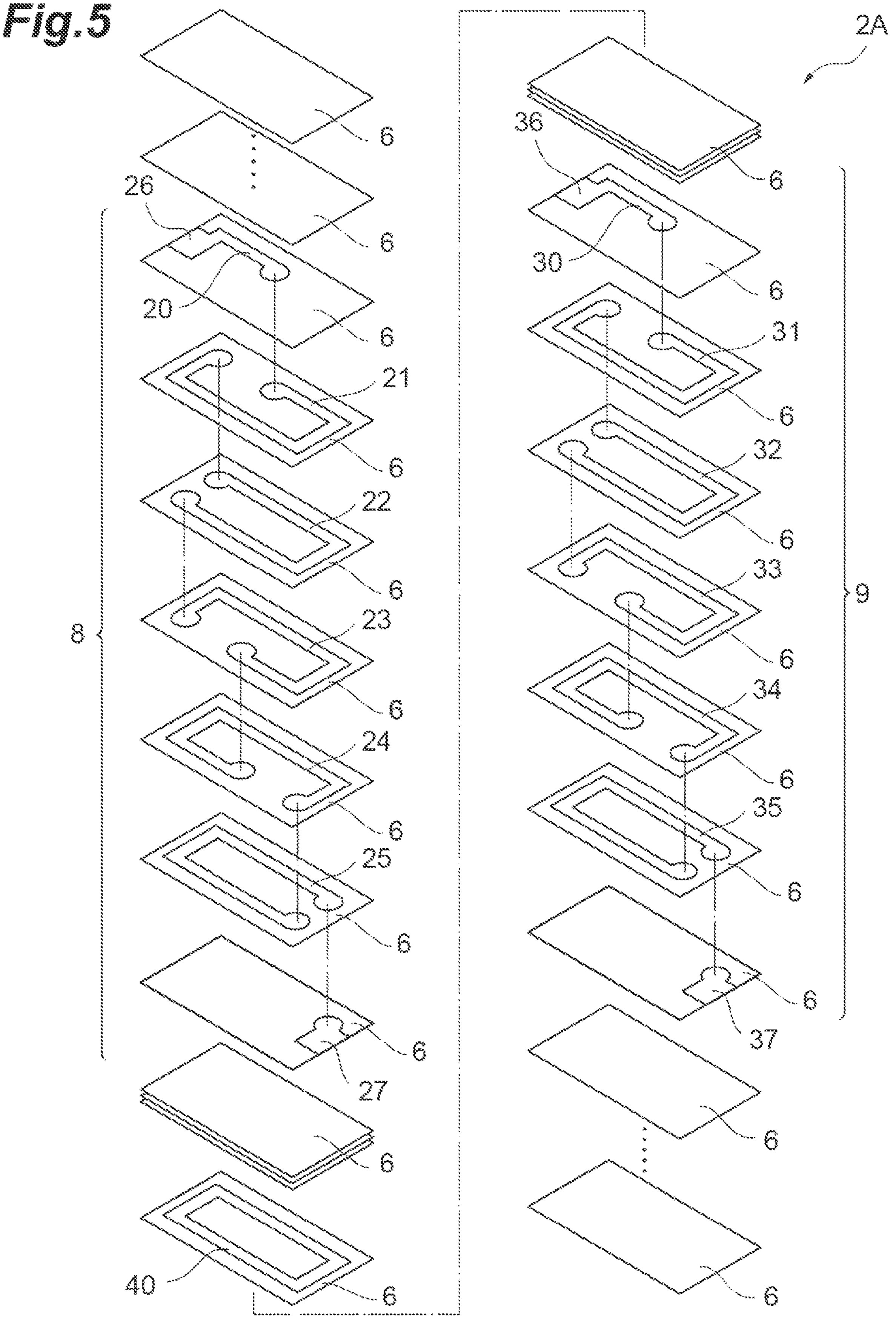
FIG. 5 is an exploded perspective view of the multilayer coil component illustrated in FIG. 4.

As illustrated in FIG. 5, the element body 2A is configured by stacking the plurality of magnetic body layers 6. Each magnetic body layer 6 is stacked in the first direction D1. In other words, the first direction D1 is the stacking direction. The element body 2A has the plurality of magnetic body layers 6 that are stacked. In the actual element body 2A, the plurality of magnetic body layers 6 are integrated to the extent that the boundary between the layers cannot be visually recognized.

As for the multilayer coil component 1A, the first coil 8 and the second coil 9 are disposed in the element body 2 as illustrated in FIG. 4. The first coil 8 and the second coil 9 are separated in the first direction D1 in the element body 2.

The multilayer coil component 1A has a high-resistance portion 40 disposed in the element body 2. The high-resistance portion 40 is disposed in the region where the first coil 8 and the second coil 9 overlap when viewed from the first direction D1. In the present embodiment, the high-resistance portion 40 has a frame shape. The width dimension of the high-resistance portion 40 is equal to or greater than the width dimensions of the first coil conductors 20, 21, 22, 23, 24, and 25 and the second coil conductors 30, 31, 32, 33, 34, and 35. The high-resistance portion 40 is higher in electrical resistivity than the magnetic body layer 6 of the element body 2. The high-resistance portion 40 is formed of, for example, $ZrO_2$. The high-resistance portion 40 is not limited to the frame shape and may be, for example, rectangular. In a case where the high-resistance portion 40 is rectangular, the outer edge of the high-resistance portion 40 covers the outer edges of the first coil conductors 20, 21, 22, 23, 24, and 25 and the second coil conductors 30, 31, 32, 33, 34, and 35 when viewed from the first direction D1.

As described above, in the multilayer coil component 1A according to the present embodiment, the first coil 8 and the second coil 9 are disposed in the element body 2A. Accordingly, in the multilayer coil component 1A, the electrical resistivity of direct current resistance can be reduced.

In the multilayer coil component 1A according to the present embodiment, the high-resistance portion 40 having a width dimension equal to or greater than the width dimensions of the first coil conductors 20, 21, 22, 23, 24, and 25 and the second coil conductors 30, 31, 32, 33, 34, and 35 and higher in electrical resistivity than the magnetic body layer 6 is disposed in the region where the first coil 8 and the second coil 9 overlap when viewed from the first direction D1. In this configuration, the electrical resistivity between the layers of the first coil 8 and the second coil 9 can be made higher than that of the element body material by the high-resistance portion 40. As a result, the withstand voltage of the multilayer coil component 1A can be improved.

A form in which the high-resistance portion 40 is formed of $ZrO_2$ in the multilayer coil component 1A has been described as an example. However, the high-resistance portion 40 may be a void. In a case where the high-resistance portion 40 is a void, a green sheet to become the magnetic body layer 6 is formed, and a through portion is formed by laser machining at the position on the green sheet where the high-resistance portion 40 (void) is to be formed. Subsequently, the through portion is filled with a resin that disappears when a green sheet-stacked green chip is fired. By firing the green chip, the resin disappears and the void is formed.

Third Embodiment

Figure 6:
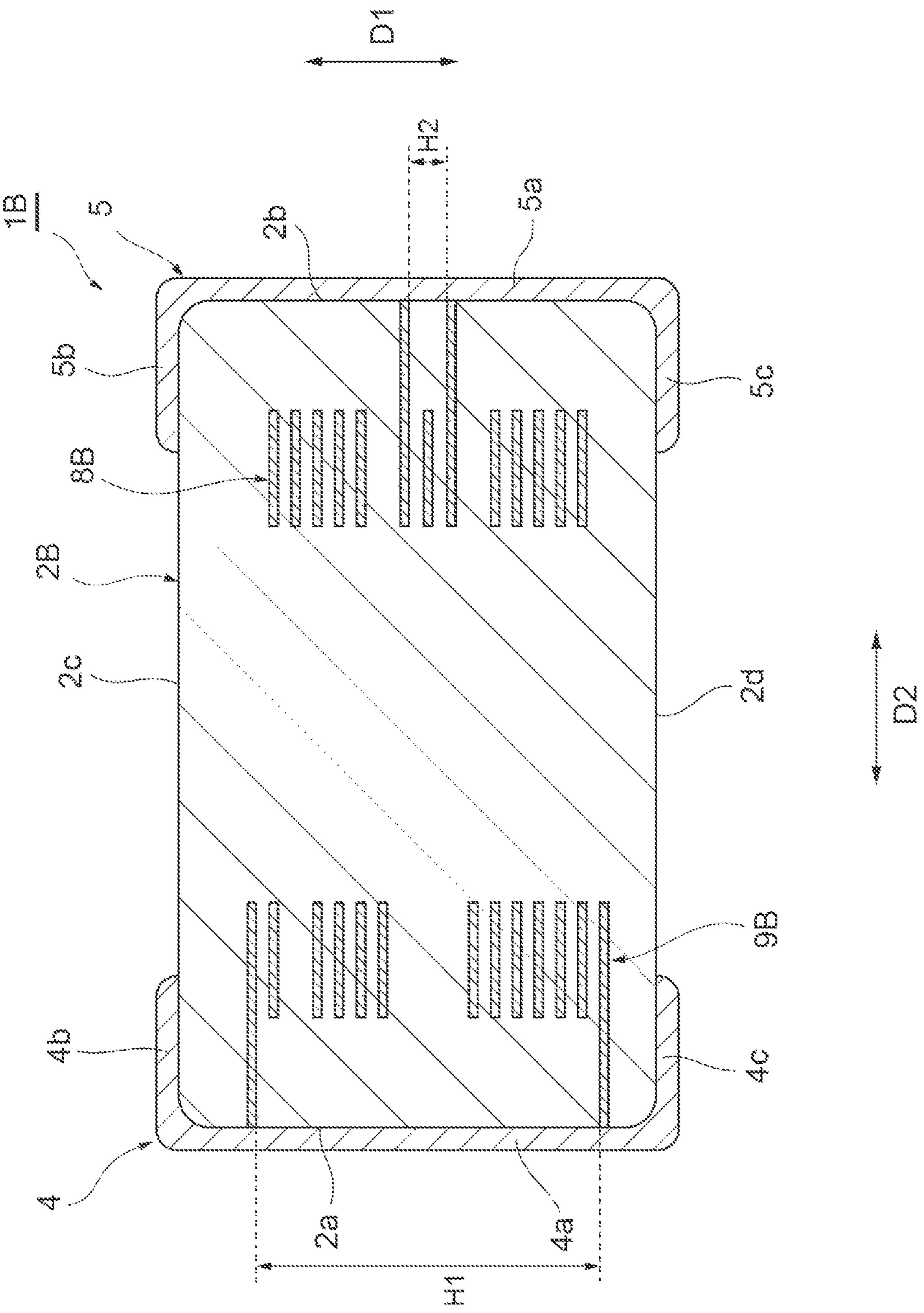
FIG. 6 is a diagram illustrating a cross-sectional configuration of a multilayer coil component according to a third embodiment.

Next, a third embodiment will be described. As illustrated in FIG. 6, a multilayer coil component 1B according to the third embodiment includes an element body 2B and the first external electrode 4 and the second external electrode 5 respectively disposed on both end portions of the element body 2B.

Figure 7:
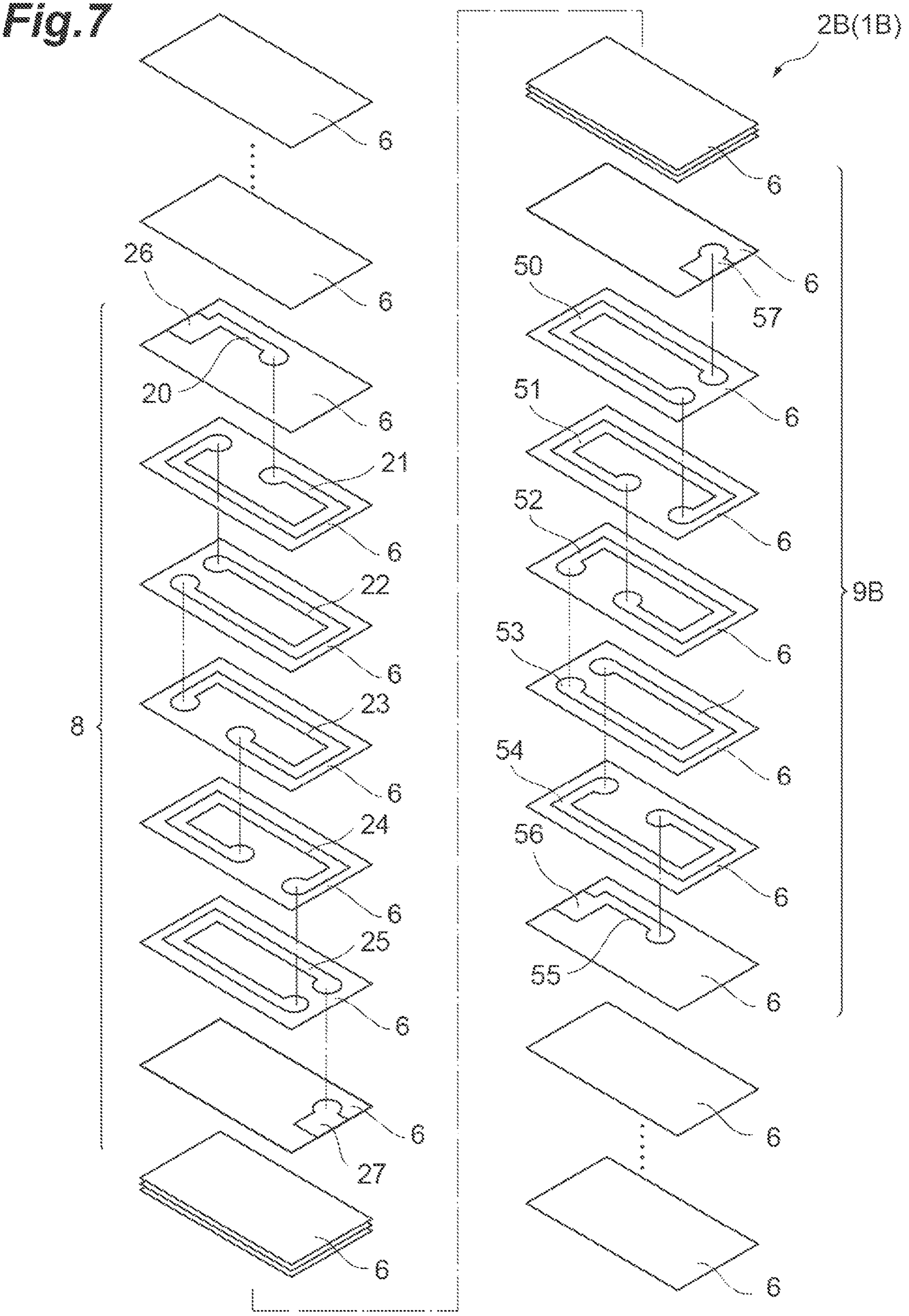
FIG. 7 is an exploded perspective view of the multilayer coil component illustrated in FIG. 6.

As illustrated in FIG. 7, the element body 2B is configured by stacking the plurality of magnetic body layers 6. Each magnetic body layer 6 is stacked in the first direction D1. In other words, the first direction D1 is the stacking direction. The element body 2B has the plurality of magnetic body layers 6 that are stacked. In the actual element body 2B, the plurality of magnetic body layers 6 are integrated to the extent that the boundary between the layers cannot be visually recognized.

As for the multilayer coil component 1B, the first coil 8 and a second coil 9B are disposed in the element body 2B as illustrated in FIG. 6. The first coil 8 and the second coil 9B are separated in the first direction D1 in the element body 2B. In the present embodiment, the first coil 8 is disposed on the main surface 2*c* side of the element body 2B. Specifically, the first coil 8 is disposed in the region that is closer to the main surface 2*c* side than the middle of the element body 2B in the first direction D1. The second coil 9B is disposed on the main surface 2*d* side of the element body 2B. Specifically, the second coil 9B is disposed in the region that is closer to the main surface 2*d* side than the middle of the element body 2B in the first direction D1. In the multilayer coil component 1, the first coil 8 and the second coil 9B are electrically connected in parallel.

As illustrated in FIG. 7, the first coil 8 is configured in a spiral shape with the plurality of first coil conductors 20, 21, 22, 23, 24, and 25 and the first connecting conductor 26 and the second connecting conductor 27 electrically connected. The first coil conductor 20 and the first connecting conductor 26 are integrally formed. The adjacent first coil conductors 20, 21, 22, 23, 24, and 25 are electrically connected by a through hole conductor (not illustrated). The first coil conductor 25 and the second connecting conductor 27 are electrically connected by a through hole conductor (not illustrated). The first connecting conductor 26 configures one end portion of the first coil 8. The first connecting conductor 26 is exposed on the end surface 2*a* of the element body 2 and is connected to the first external electrode 4 (first electrode part 4*a*). The second connecting conductor 27 configures the other end portion of the first coil 8. The second connecting conductor 27 is exposed on the end surface 2*b* of the element body 2 and is connected to the second external electrode 5 (first electrode part 5*a*).

The second coil 9B is configured in a spiral shape with a plurality of second coil conductors 50, 51, 52, 53, 54, and 55 and a third connecting conductor 56 and a fourth connecting conductor 57 electrically connected. The second coil conductor 55 and the third connecting conductor 56 are integrally formed. The adjacent second coil conductors 50, 51, 52, 53, 54, and 55 are electrically connected by a through hole conductor (not illustrated). The second coil conductor 50 and the fourth connecting conductor 57 are electrically connected by a through hole conductor (not illustrated). The third connecting conductor 56 configures one end portion of the second coil 9B. The third connecting conductor 56 is exposed on the end surface 2*a* of the element body 2B and is connected to the first external electrode 4 (first electrode part 4*a*). The fourth connecting conductor 57 configures the other end portion of the second coil 9B. The fourth connecting conductor 57 is exposed on the end surface 2*b* of the element body 2B and is connected to the second external electrode 5 (first electrode part 5*a*).

As illustrated in FIG. 6, in the multilayer coil component 1B, the distance H1 between the first connecting conductor 26 of the first coil 8 and the third connecting conductor 56 of the second coil 9B is longer than the distance H2 between the second connecting conductor 27 of the first coil 8 and the fourth connecting conductor 57 of the second coil 9B. In other words, the distance H2 between the second connecting conductor 27 of the first coil 8 and the fourth connecting conductor 57 of the second coil 9B is shorter than the distance H1 between the first connecting conductor 26 of the first coil 8 and the third connecting conductor 56 of the second coil 9B. The winding direction of the first coil 8 and the winding direction of the second coil 9B are the same. As a result, when a current flows through the multilayer coil component 1, the orientation of the magnetic flux generated in the first coil 8 and the orientation of the magnetic flux generated in the second coil 9 become the same.

As described above, in the multilayer coil component 1B according to the present embodiment, the first coil 8 and the second coil 9B are disposed in the element body 2B. Accordingly, in the multilayer coil component 1B, the electrical resistivity of direct current resistance can be reduced.

In the multilayer coil component 1B according to the present embodiment, in the first direction D1, the distance H2 between the second connecting conductor 27 of the first coil 8 and the fourth connecting conductor 57 of the second coil 9B is shorter than the distance H1 between the first connecting conductor 26 of the first coil 8 and the third connecting conductor 56 of the second coil 9B. In this configuration, by the distance H2 between the second connecting conductor 27 of the first coil 8 and the fourth connecting conductor 57 of the second coil 9B being shorter than the distance H1 between the first connecting conductor 26 of the first coil 8 and the third connecting conductor 56 of the second coil 9B, it is possible to reduce the potential difference between the first coil 8 and the second coil 9B when a current flows through the first coil 8 and the second coil 9B. Accordingly, the withstand voltage of the multilayer coil component 1B can be improved.

In the multilayer coil component 1B according to the present embodiment, the winding direction of the first coil 8 and the winding direction of the second coil 9B are the same when viewed from the first direction D1. In this configuration, the orientations of the magnetic fluxes of the first coil 8 and the second coil 9B are the same. As a result, the inductance values of the first coil 8 and the second coil 9B can be made equal.

In the multilayer coil component 1B, the element body 2B may have the magnetic body layer 7 (high-resistance layer) as in the case of the multilayer coil component 1 or the high-resistance portion 40 may be disposed in the element body 2B as in the case of the multilayer coil component 1A.

Fourth Embodiment

Figure 8:
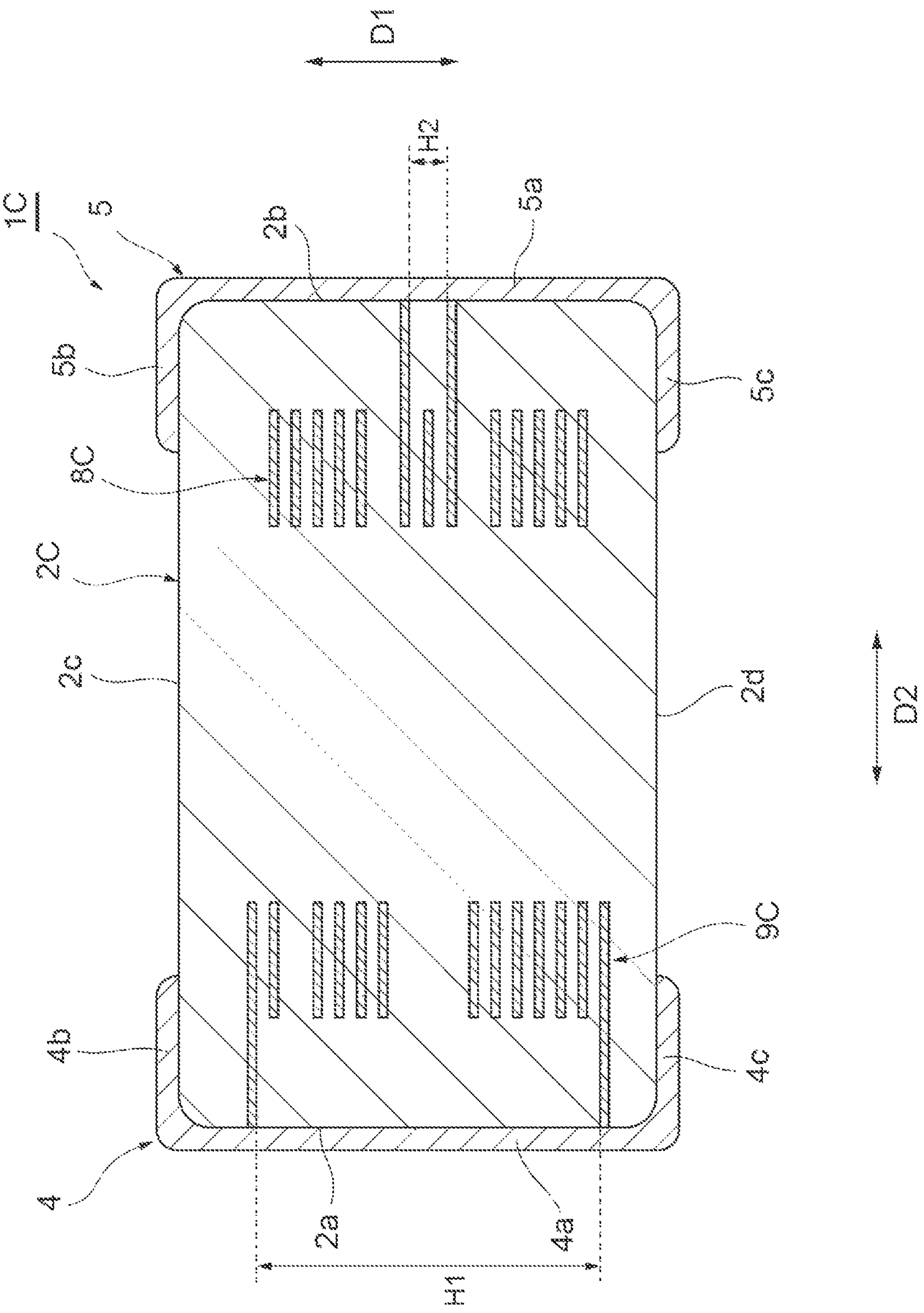
FIG. 8 is a diagram illustrating a cross-sectional configuration of a multilayer coil component according to a fourth embodiment.

Next, a fourth embodiment will be described. As illustrated in FIG. 8, a multilayer coil component 1C according to the fourth embodiment includes an element body 2C and the first external electrode 4 and the second external electrode 5 respectively disposed on both end portions of the element body 2C.

Figure 9:
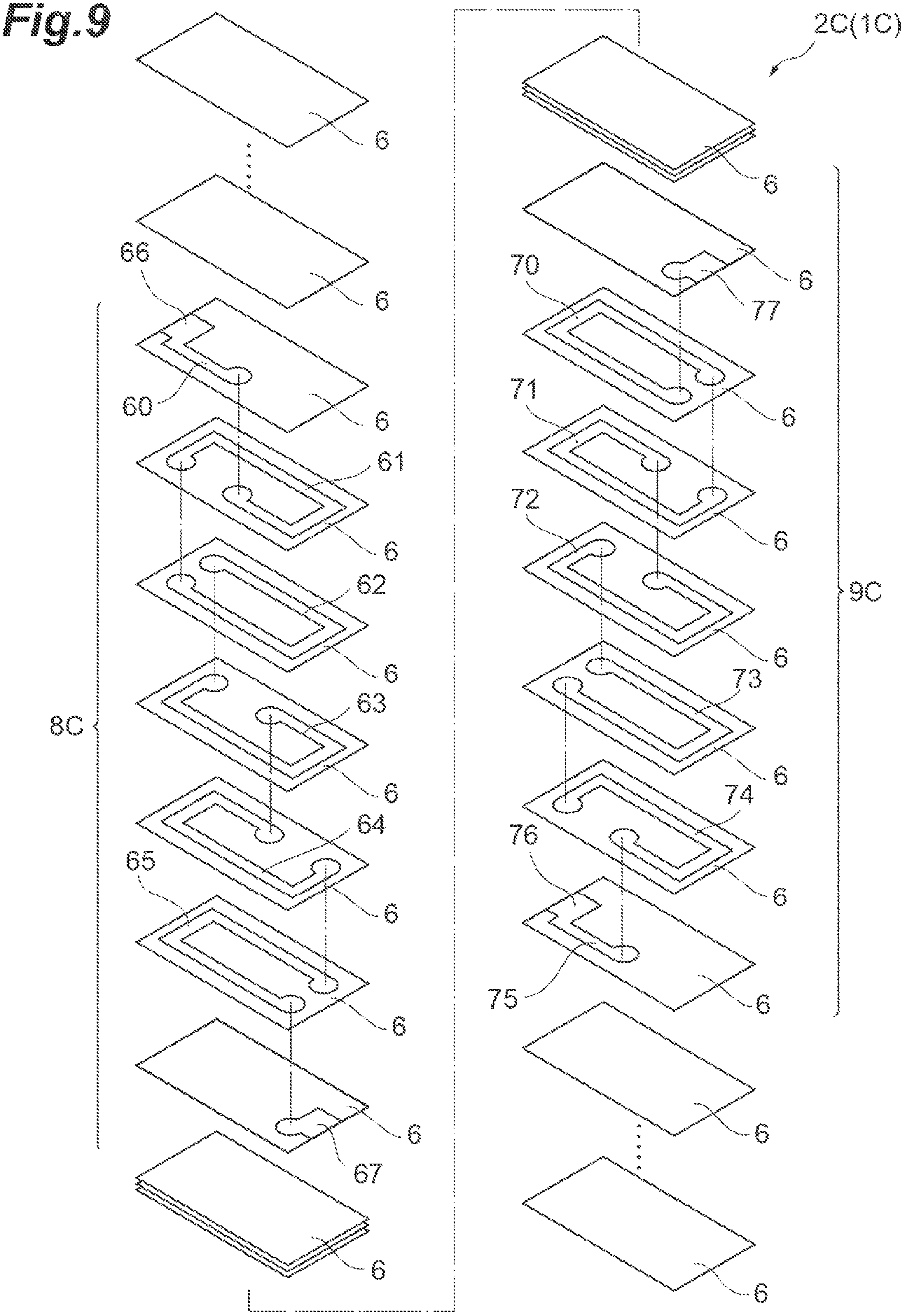
FIG. 9 is an exploded perspective view of the multilayer coil component illustrated in FIG. 8.

As illustrated in FIG. 9, the element body 2C is configured by stacking the plurality of magnetic body layers 6. Each magnetic body layer 6 is stacked in the first direction D1. In other words, the first direction D1 is the stacking direction. The element body 2C has the plurality of magnetic body layers 6 that are stacked. In the actual element body 2C, the plurality of magnetic body layers 6 are integrated to the extent that the boundary between the layers cannot be visually recognized.

As for the multilayer coil component 1C, a first coil 8C and a second coil 9C are disposed in the element body 2C as illustrated in FIG. 8. The first coil 8C and the second coil 9C are separated in the first direction D1 in the element body 2C. In the present embodiment, the first coil 8 is disposed on the main surface 2*c* side of the element body 2C. Specifically, the first coil 8C is disposed in the region that is closer to the main surface 2*c* side than the middle of the element body 2C in the first direction D1. The second coil 9B is disposed on the main surface 2*d* side of the element body 2C. Specifically, the second coil 9B is disposed in the region that is closer to the main surface 2*d* side than the middle of the element body 2C in the first direction D1. In the multilayer coil component 1C, the first coil 8C and the second coil 9C are electrically connected in parallel.

As illustrated in FIG. 9, the first coil 8C is configured by electrically connecting a plurality of first coil conductors 60, 61, 62, 63, 64, and 65 and a first connecting conductor 66 and a second connecting conductor 67. The first coil conductor 60 and the first connecting conductor 66 are integrally formed. The adjacent first coil conductors 60, 61, 62, 63, 64, and 65 are electrically connected by a through hole conductor (not illustrated). The first coil conductor 65 and the second connecting conductor 67 are electrically connected by a through hole conductor (not illustrated). The first connecting conductor 66 configures one end portion of the first coil 8C. The first connecting conductor 66 is exposed on the end surface 2*a* of the element body 2C and is connected to the first external electrode 4 (first electrode part 4*a*). The second connecting conductor 67 configures the other end portion of the first coil 8C. The second connecting conductor 67 is exposed on the end surface 2*b* of the element body 2C and is connected to the second external electrode 5 (first electrode part 5*a*).

The second coil 9C is configured by electrically connecting a plurality of second coil conductors 70, 71, 72, 73, 74, and 75 and a third connecting conductor 76 and a fourth connecting conductor 77. The second coil conductor 75 and the third connecting conductor 76 are integrally formed. The adjacent second coil conductors 70, 71, 72, 73, 74, and 75 are electrically connected by a through hole conductor (not illustrated). The second coil conductor 70 and the fourth connecting conductor 77 are electrically connected by a through hole conductor (not illustrated). The third connecting conductor 76 configures one end portion of the second coil 9C. The third connecting conductor 76 is exposed on the end surface 2*a* of the element body 2C and is connected to the first external electrode 4 (first electrode part 4*a*). The fourth connecting conductor 77 configures the other end portion of the second coil 9C. The fourth connecting conductor 77 is exposed on the end surface 2*b* of the element body 2C and is connected to the second external electrode 5 (first electrode part 5*a*).

As illustrated in FIG. 8, in the multilayer coil component 1C, the distance H1 between the first connecting conductor 66 of the first coil 8C and the third connecting conductor 76 of the second coil 9C is longer than the distance H2 between the second connecting conductor 67 of the first coil 8C and the fourth connecting conductor 77 of the second coil 9C. In other words, the distance H2 between the second connecting conductor 67 of the first coil 8C and the fourth connecting conductor 77 of the second coil 9C is shorter than the distance H1 between the first connecting conductor 66 of the first coil 8C and the third connecting conductor 76 of the second coil 9C. The winding direction of the first coil 8C and the winding direction of the second coil 9C are opposite (reverse). As a result, when a current flows through the multilayer coil component 1C, the magnetic flux generated in the first coil 8 and the magnetic flux generated in the second coil 9 cancel each other out (offset).

As described above, in the multilayer coil component 1C according to the present embodiment, the first coil 8C and the second coil 9C are disposed in the element body 2C. Accordingly, in the multilayer coil component 1C, the electrical resistivity of direct current resistance can be reduced.

In the multilayer coil component 1C according to the present embodiment, in the first direction D1, the distance H2 between the second connecting conductor 67 of the first coil 8C and the fourth connecting conductor 77 of the second coil 9B is shorter than the distance H1 between the first connecting conductor 66 of the first coil 8C and the third connecting conductor 76 of the second coil 9C. In this configuration, by the distance H2 between the second connecting conductor 67 of the first coil 8C and the fourth connecting conductor 77 of the second coil 9C being shorter than the distance H1 between the first connecting conductor 66 of the first coil 8C and the third connecting conductor 76 of the second coil 9C, it is possible to reduce the potential difference between the first coil 8C and the second coil 9C when a current flows through the first coil 8C and the second coil 9C. Accordingly, the withstand voltage of the multilayer coil component 1C can be improved.

In the multilayer coil component 1C according to the present embodiment, the winding direction of the first coil 8C and the winding direction of the second coil 9C are opposite when viewed from the first direction D1. In this configuration, the magnetic flux generated by the first coil 8C and the magnetic flux generated by the second coil 9C cancel each other out. Accordingly, magnetic saturation can be suppressed, and thus direct current superimposition characteristics can be improved.

In the multilayer coil component 1C according to the present embodiment, the plurality of first coil conductors 60, 61, 62, 63, 64, and 65 of the first coil 8C and the plurality of second coil conductors 70, 71, 72, 73, 74, and 75 of the second coil 9C are equal in number. In this configuration, the magnetic flux generated by the first coil 8C and the magnetic flux generated by the second coil 9C can be effectively offset. Accordingly, magnetic saturation can be suppressed more effectively, and thus direct current superimposition characteristics can be improved.

In the multilayer coil component 1C, the element body 2B may have the magnetic body layer 7 (high-resistance layer) as in the case of the multilayer coil component 1 or the high-resistance portion 40 may be disposed in the element body 2B as in the case of the multilayer coil component 1A.

Although embodiments of the present invention have been described above, the present invention is not necessarily limited to the above embodiments and various modifications can be made without departing from the gist thereof.

The number of first coil conductors and the number of second coil conductors are not limited to the values described above. In the case of a configuration in which the winding direction of the first coil 8C and the winding direction of the second coil 9C are opposite and the orientations of the magnetic fluxes are different as in the multilayer coil component 1B of the fourth embodiment, the number of first coil conductors and the number of second coil conductors are preferably the same.

In the multilayer coil component 1, the distance in the first direction D1 between the first coil 8 and the second coil 9C may be increased from the viewpoint of withstand voltage improvement. The same applies to the multilayer coil component 1A, the multilayer coil component 1B, and the multilayer coil component 1C.

The first external electrode 4 may have only the first electrode part 4*a* or only the second electrode part 4*b*. Likewise, the second external electrode 5 may have only the first electrode part 5*a* or only the second electrode part 5*b*. Various shapes can be adopted for the first external electrode 4 and the second external electrode 5.

What is claimed is:

1. A multilayer coil component comprising:
- an element body formed by stacking a magnetic body layer containing a plurality of metal magnetic particles of a soft magnetic material;
- a first coil disposed in the element body and configured to include a plurality of first coil conductors;
- a second coil disposed in the element body and configured to include a plurality of second coil conductors;
- a first external electrode to which one end portion of each of the first coil and the second coil is connected; and
- a second external electrode to which the other end portion of each of the first coil and the second coil is connected, wherein
- the first coil and the second coil are separated from each other in a stacking direction of the magnetic body layer in the element body, and
- between the first coil and the second coil of the element body, at least a region where the first coil and the second coil overlap when viewed from the stacking direction is higher in electrical resistivity than the magnetic body layer.

2. The multilayer coil component according to claim 1, wherein a high-resistance portion having a width dimension equal to or greater than width dimensions of the first coil conductor and the second coil conductor and higher in electrical resistivity than the magnetic body layer is disposed in the region where the first coil and the second coil overlap when viewed from the stacking direction.

3. The multilayer coil component according to claim 1, wherein a high-resistance layer higher in electrical resistivity than the magnetic body layer is provided between the first coil and the second coil in the element body.

4. The multilayer coil component according to claim 1, wherein
- the first coil has a first connecting conductor connected to the first external electrode and a second connecting conductor connected to the second external electrode,
- the second coil has a third connecting conductor connected to the first external electrode and a fourth connecting conductor connected to the second external electrode, a distance between the second connecting conductor and the fourth connecting conductor is shorter than a distance between the first connecting conductor and the third connecting conductor in the stacking direction of the magnetic body layer, and a winding direction of the first coil and a winding direction of the second coil are the same when viewed from the stacking direction.

5. The multilayer coil component according to claim 1, wherein a plurality of metal magnetic particles are disposed along the stacking direction of the magnetic body layer between the first coil and the second coil.

6. A multilayer coil component comprising:

an element body formed by stacking a magnetic body layer containing a plurality of metal magnetic particles of a soft magnetic material;

a first coil disposed in the element body and configured to include a plurality of first coil conductors;

a second coil disposed in the element body and configured to include a plurality of second coil conductors;

a first external electrode to which one end portion of each of the first coil and the second coil is connected; and a second external electrode to which the other end portion of each of the first coil and the second coil is connected, wherein a conductor closest to the second coil in the first coil and a conductor closest to the first coil in the second coil do not overlap when viewed from the stacking direction of the magnetic body layer.

7. A multilayer coil component comprising:

an element body formed by stacking a magnetic body layer containing a plurality of metal magnetic particles of a soft magnetic material;

a first coil disposed in the element body and configured to include a plurality of first coil conductors;

a second coil disposed in the element body and configured to include a plurality of second coil conductors;

a first external electrode to which one end portion of each of the first coil and the second coil is connected; and a second external electrode to which the other end portion of each of the first coil and the second coil is connected, wherein the first coil has a first connecting conductor connected to the first external electrode and a second connecting conductor connected to the second external electrode, the second coil has a third connecting conductor connected to the first external electrode and a fourth connecting conductor connected to the second external electrode, a distance between the second connecting conductor and the fourth connecting conductor is shorter than a distance between the first connecting conductor and the third connecting conductor in a stacking direction of the magnetic body layer, and a winding direction of the first coil is opposite to a winding direction of the second coil when viewed from the stacking direction.

8. The multilayer coil component according to claim 7, wherein the number of the first coil conductors of the first coil is the same as the number of the second coil conductors of the second coil.

* * * * *